United States Patent
Cohen

(10) Patent No.: US 8,620,227 B2
(45) Date of Patent: Dec. 31, 2013

(54) DEVICE, SYSTEM AND METHOD OF SELECTIVELY CONNECTING BETWEEN A TRANSMIT CHAIN AND AN ANTENNA

(75) Inventor: Emanuel Cohen, Zichron Yakov (IL)

(73) Assignee: Intel Corporation, Santa Clara, CA (US)

( * ) Notice: Subject to any disclaimer, the term of this patent is extended or adjusted under 35 U.S.C. 154(b) by 492 days.

(21) Appl. No.: 12/836,711

(22) Filed: Jul. 15, 2010

(65) Prior Publication Data

US 2012/0015615 A1  Jan. 19, 2012

(51) Int. Cl.
*H04B 1/44* (2006.01)

(52) U.S. Cl.
USPC .......................... 455/78; 455/83; 455/127.2

(58) Field of Classification Search
USPC ............ 455/78, 80, 82, 83, 550.1, 91, 115.1, 455/127.1, 128, 129, 127.2
See application file for complete search history.

(56) References Cited

U.S. PATENT DOCUMENTS

| | | | |
|---|---|---|---|
| 5,442,812 A * | 8/1995 | Ishizaki et al. | 455/82 |
| 6,567,647 B1 | 5/2003 | Epperson | |
| 7,565,113 B2 | 7/2009 | Dacosta | |
| 2008/0159435 A1 | 7/2008 | Cohen | |

OTHER PUBLICATIONS

Search Report and Written Opinion for PCT/US2011/043501 mailed on Jan. 18, 2012.
International Preliminary Report on Patentability Received for PCT Patent Application No. PCT/US2011/043501, Mailed on Jan. 24, 2013, 6 pages.

* cited by examiner

*Primary Examiner* — Thanh Le
(74) *Attorney, Agent, or Firm* — Shichrur & Co.

(57) ABSTRACT

Some demonstrative embodiments include devices, systems and/or methods of selectively connecting between a transmit chain and an antenna. For example, a device may include a transmit chain and a non-active connector module configured to electrically connect the transmit chain to at least one antenna when the transmit chain generates a wireless communication signal, and to electrically disconnect the antenna from the transmit chain when a wireless communication signal is received via the antenna.

18 Claims, 4 Drawing Sheets

DEVICE, SYSTEM AND METHOD OF SELECTIVELY CONNECTING BETWEEN A TRANSMIT CHAIN AND AN ANTENNA

BACKGROUND

A wireless communication device may include at least one antenna to transmit wireless communication signals generated by a Transmit (Tx) chain and to receive wireless communication signals intended to be processed by a Receive (Rx) chain.

The wireless communication device may include one or more Radio Frequency (RF) switches to connect the Tx chain to the antenna when the wireless communication signals are generated by the Tx chain and to disconnect the Tx chain from the antenna when the wireless communication signals are received by the antenna.

The use of the RF switch may result in a power loss. The power loss may be increased, for example, when the RF switch is integrated into a Radio Frequency Integrated Circuit (RFIC) and/or when the RF switch is operated at increased frequencies.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
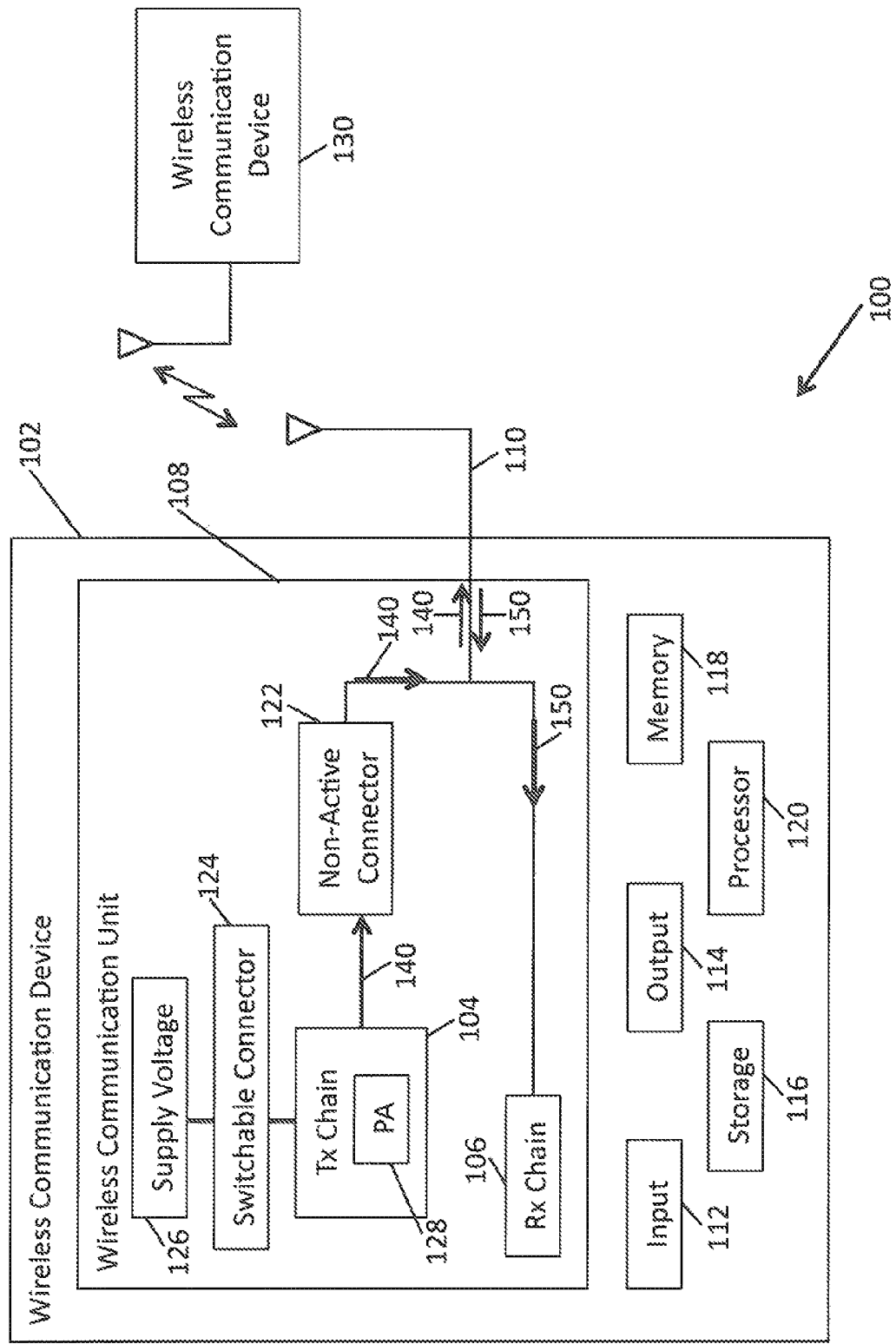
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing IEEE 802.11 (*IEEE Standard for Information technology—Telecommunications and information exchange between systems—Local and metropolitan area networks—Specific requirements, Part 11: Wireless LAN Medium Access Control (MAC) and Physical Layer (PHY) Specifications—June 2007*), 802.11n, 802.11ac, 802.11 task group ad (TGad), 802.16 (*IEEE—Std 802.16, 2004 Edition, Air Interface for Fixed Broadband Wireless Access Systems*), 802.16d, 802.16e (*IEEE—Std 802.16e, 2005 Edition, Physical and Medium Access Control Layers for Combined Fixed and Mobile Operation in Licensed Bands*), 802.16f, 802.16m standards ("the IEEE 802 standards") and/or future versions and/or derivatives thereof, devices and/or networks operating in accordance with existing Wireless-Gigabit-Alliance (WGA) and/or WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like.

Reference is now made to FIG. 1, which schematically illustrates a block diagram of a system 100 in accordance with some demonstrative embodiments.

In some demonstrative embodiments, one or more elements of system 100 may be capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

As shown in FIG. 1, in some demonstrative embodiments, system 100 may include two or more devices, e.g., wireless communication devices 102 and 130, which communicate in a wireless manner to transfer data, e.g., as defined by the IEEE 802 standards, and the like.

In some demonstrative embodiments, at least one of devices 102 and 130, e.g., device 102, may include a wireless communication unit 108 capable of transmitting and/or receiving wireless communication transmissions to and/or from one or more other devices of system 100, e.g., device 130.

In some demonstrative embodiments, one or more of wireless communication devices 102 and 130 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, one or more of wireless communication devices 102 and 130 may include, for example, one or more of a processor 120, an input unit 112, an output unit 114, a memory unit 118 and a storage unit 116. Devices 102 and 130 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of device 102, and/or of one or more suitable applications.

Input unit 112 includes, for example, a keyboard, a keypad, a mouse, a touch-pad, a track-ball, a stylus, a microphone, or other suitable pointing device or input device. Output unit 114 includes, for example, a monitor, a screen, a flat panel display, a Cathode Ray Tube (CRT) display, a Liquid Crystal Display (LCD), an LED display, a plasma display unit, one or more audio speakers or earphones, or other suitable output devices.

Memory unit 118 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 116 includes, for example, a hard disk drive, a floppy disk drive, a Compact Disk (CD) drive, a CD-ROM drive, a DVD drive, or other suitable removable or non-removable storage units. Memory unit 118 and/or storage unit 116, for example, store data processed by device 102.

In some demonstrative embodiments, wireless communication unit 108 includes or may be part of, for example, one or more wireless transmitters, receivers and/or transceivers able to send and/or receive wireless communication signals, RF signals, frames, blocks, transmission streams, packets, messages, specific data items, and/or any other type of communication data. For example, wireless communication unit 108 may include or may be implemented as part of a suitable wireless communication unit, for example, a suitable wireless Network Interface Card (NIC), and the like.

In some demonstrative embodiments, wireless communication unit 108 may include, or may be associated with, at least antenna 110. Antenna 110 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, wireless communication unit 108 may utilize antenna 110 to transmit a wireless communication signal generated by at least one Transmit (Tx) chain 104, e.g., when wireless communication unit 108 is operating at a transmission mode; and to receive wireless communication signals intended to be processed by at least one Receive (Rx) chain 106, e.g., when wireless communication unit 108 is operating at a reception mode.

In some demonstrative embodiments, Tx chain 104 may include any suitable Tx chain components, modules and/or elements to generate a wireless communication signal 140 (also referred to herein as an "outgoing signal") to be transmitted via antenna 110. Rx chain 106 may include any suitable Rx chain components, modules and/or elements to process a wireless communication signal 150 (also referred to herein as an "incoming signal") received, e.g., from wireless communication device 130, via antenna 110.

In some demonstrative embodiments, wireless communication unit 108 may be configured to selectively electrically connect and/or disconnect between Tx chain 104 and antenna 110, for example, without using a Radio Frequency (RF) switch on a path between Tx chain 104 and antenna 110, e.g., as described in detail below.

In some demonstrative embodiments, Tx chain 104 may include at least one Power Amplifier (PA) 128 to amplify wireless communication signal 140, e.g., when wireless communication unit 106 is operating at the transmission mode.

In some demonstrative embodiments, wireless communication unit 108 may be configured to utilize power amplifier 128 as an electric shunt, for example, when wireless communication signal 150 is received via antenna 110, e.g., as described below.

In some demonstrative embodiments, wireless communication unit 108 may activate PA 128 to amplify outgoing signal 140, e.g., when wireless communication unit 108 is operating at the transmission mode; and/or wireless communication unit 108 may ground power amplifier 128 when wireless communication signal 150 is received via antenna 110. For example, a first bias voltage may be provided to power amplifier 128 to activate power amplifier 128, and a second bias voltage may be provided to power amplifier 128 to ground power amplifier 128, e.g., as described below with reference to FIG. 2.

In some demonstrative embodiments, PA 128 may be connected to a supply voltage 126, when PA 128 is active; and/or PA 128 may be disconnected from supply voltage 126, when PA 128 is grounded, for example, in order to reduce power loss and/or drainage of power supply 126 via PA 128. Supply voltage 126 may include, for example, a positive operating voltage of device 102, e.g., Voltage drain drain (Vdd) power supply, and/or any other suitable supply voltage.

In some demonstrative embodiments, wireless communication unit 108 may include a switchable connector 124 to selectively connect between PA 128 and supply voltage 126. For example, wireless communication unit 108 may cause switchable connector 124 to switch between a first mode at which PA 128 is connected to supply voltage 126, and a second mode at which PA 128 is disconnected from supply voltage 126. For example, wireless communication unit 108 may switch connector 124 to connect PA 128 to supply voltage 126, for example, when PA 128 is activated, e.g., when outgoing signal 140 is transmitted via antenna 110. Wireless communication unit 108 may switch connector 124 to disconnect PA 128 from supply voltage 126, for example, when PA 128 is grounded, e.g., when incoming signal 150 is received via antenna 110. Switchable connector 124 may include any suitable connector, e.g., a physical component, capable of connecting or disconnecting PA 128 to supply voltage 126. For example, switchable connector 124 may include any suitable voltage supply regulator, e.g., a Low Dropout (LDO) regulator or a Direct Current (DC) to DC (DC/DC) regulator capable of regulating, monitoring and/or controlling DC current supplied to PA 128. Switchable connector 124 may have, for example, a very small and/or negligible size, e.g., in comparison to the size of PA 128.

In some demonstrative embodiments, wireless communication unit 108 may include a non-active connector module 122 configured to electrically connect transmit chain 104 to antenna 110, e.g., when transmit chain 104 generates wireless communication signal 140; and/or to electrically disconnect antenna 110 from transmit chain 104, e.g., when wireless communication signal 150 is received via antenna 110, e.g., as described in detail below.

The term "non-active module", as used herein, may refer to any suitable module, which includes only passive elements and/or which does not include active elements, e.g., transistors, switches and/or any other elements, which may be controlled, switched, activated and/or operated at two or more modes.

In some demonstrative embodiments, non-active connector module 122 may include a suitable impedance matching network to match between an impedance of Tx chain 104 and an impedance of antenna 110, e.g., when signal 140 is transmitted; and/or to reflect an elevated impedance of Tx chain 104, for example, when incoming signal 150 is received via antenna 110, e.g., as described in detail below.

In some demonstrative embodiments, non-active connector module 122 may include any suitable combination of one or more inductors and/or one or more capacitors, e.g., as described below with reference to FIG. 2.

In some demonstrative embodiments, wireless communication device 102 may transmit outgoing signal 140 via antenna 110 to wireless communication device 130. For example, wireless communication unit 108 may activate PA 128 to amplify wireless communication signal 140 generated by Tx chain 104. Wireless communication unit 108 may cause switchable connector 124 to connect PA 128 to supply voltage 126. Accordingly, non-active connector module 122 may connect Tx chain 104 to antenna 110 to transmit outgoing signal 140, e.g., by matching between the impedance of Tx chain 104 and the impedance of antenna 110.

In some demonstrative embodiments, wireless communication device 130 may transmit wireless communication signal 150, and wireless communication unit 108 may operate at the reception mode to receive signal 150. Wireless communication unit 108 may ground PA 128 and, accordingly, non-active connector module 122 may electrically disconnect Tx chain 104 from antenna 110, e.g., by reflecting the elevated impedance of Tx chain 104 when incoming signal 150 is received via antenna 110. Wireless communication unit 108 may cause switchable connector 124 to disconnect PA 128 from supply voltage 126, e.g., in order to reduce and/or eliminate drainage of power source 126 via grounded PA 128.

Figure 2:
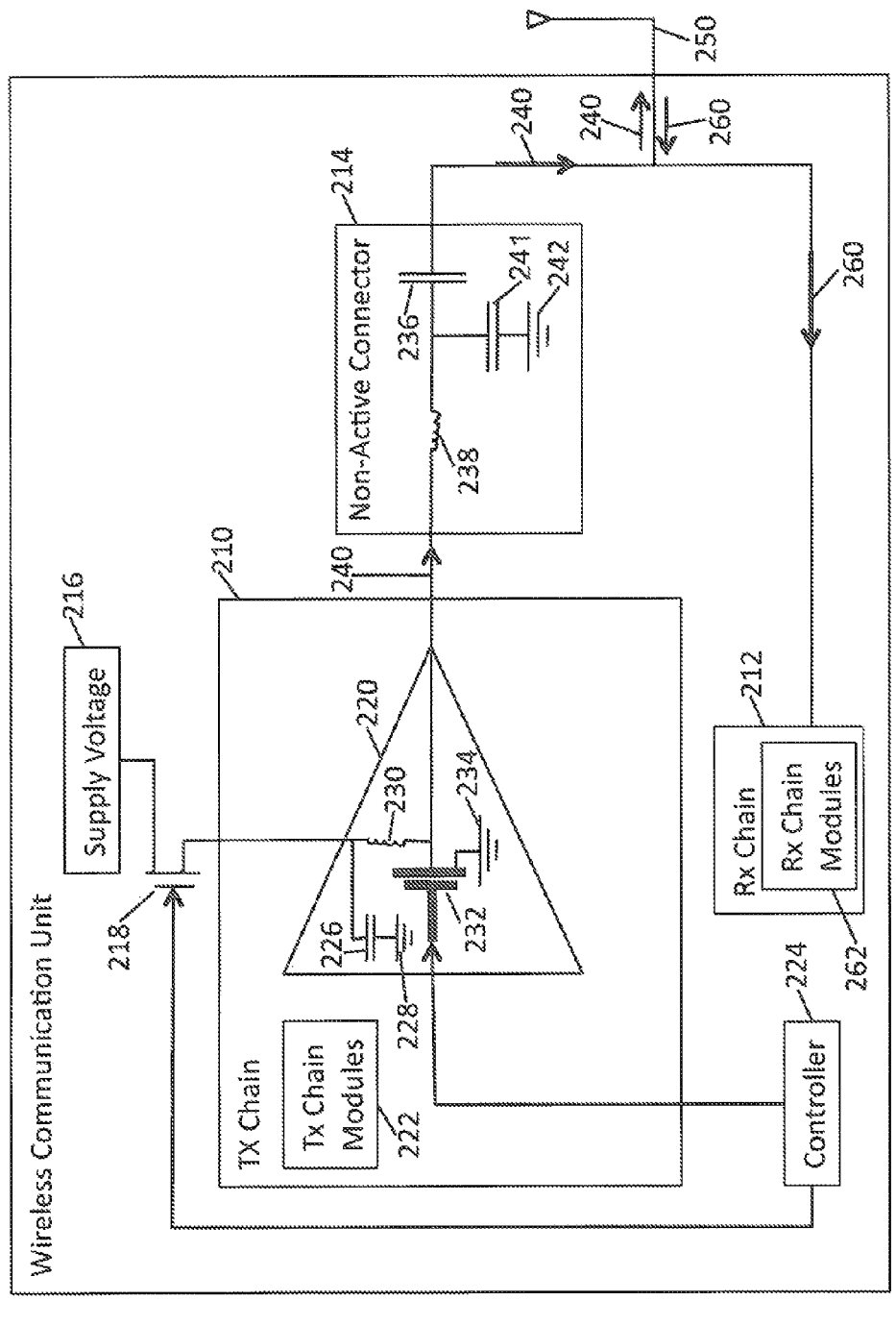
FIG. 2 is a schematic illustration of a wireless communication unit, in accordance with some demonstrative embodiments.

Reference is now made to FIG. 2, which schematically illustrates a wireless communication unit 200, in accordance with some demonstrative embodiments. In some embodiments, wireless communication unit 200 may perform the functionality of wireless communication unit 108 (FIG. 1).

In some demonstrative embodiments, wireless communication unit 200 may utilize antenna 250 to transmit an outgoing wireless communication signal 240 generated by at least one Tx chain 210, e.g., when wireless communication unit 200 is operating at a transmission mode; and/or to receive an incoming wireless communication signal 260 intended to be processed by at least one Rx chain 212, e.g., when wireless communication unit 200 is operating at a reception mode.

In some demonstrative embodiments, Tx chain 210 may include one or more Tx chain modules 222 to generate outgoing signal 240. In some demonstrative embodiments, Rx chain 106 may include one or more Rx chain modules 262 to process incoming signal 260.

In some demonstrative embodiments, wireless communication unit 200 may be configured to selectively electrically connect and/or disconnect between Tx chain 210 and antenna 250, for example, without using a Radio Frequency (RF) switch on a path between Tx chain 210 and antenna 250.

In some demonstrative embodiments, Tx chain 210 may include at least one PA 220 to amplify outgoing signal 240, e.g., when wireless communication unit 200 is operating at the transmission mode.

In some demonstrative embodiments, wireless communication unit 200 may be configured to utilize PA 220 as an electric shunt, for example, when incoming signal 260 is received via antenna 250, e.g., as described in detail below.

In some demonstrative embodiments, wireless communication unit 200 may activate PA 220 to amplify outgoing signal 240, e.g., when wireless communication unit 200 is operating at the transmission mode; and/or wireless communication unit 200 may ground PA 220 when incoming signal 260 is received via antenna 250, e.g., as described in detail below.

In some demonstrative embodiments, PA 220 may include an inductor 230, a capacitor 216 connected to a ground connection 228 and/or at least one transistor 232 connected to a ground connection 234.

In some demonstrative embodiments, wireless communication unit 200 may include a controller 224 to controllably activate PA 220. For example, controller 224 may provide transistor 232 with a first bias voltage to cause PA 220 to be activated to amplify outgoing signal 240; or a second bias voltage to cause PA 220 to be grounded through ground connection 234, e.g., when incoming signal 260 is received.

In some demonstrative embodiments, the second bias voltage may be greater than the first bias voltage, for example, the first bias voltage may be 0.7 volts (V) and the second bias voltage may be greater than 0.7V, e.g., 1.3V. For example, when Tx chain 210 generates outgoing signal 240, controller 224 may activate PA 220 to amplify outgoing signal 240, by providing transistor 232 with the first bias voltage, e.g., 0.7V. When incoming signal 260 is received by unit 200, controller 224 may ground PA 220 by providing transistor 232 with the second bias voltage, e.g., 1.3V.

In some demonstrative embodiments, at least one transistor 232 may include two or more transistors, e.g., a first transistor and a second transistor connected in series (not shown), for example, to enable wireless communication unit 200 to operate at a relatively low frequency, e.g., 2 GHz. According to these embodiments, controller 224 may provide the first and second transistors with a first set of first and second bias voltages, respectively, to cause PA 220 to be activated to amplify outgoing signal 240; and controller 224 may provide the first and second transistors with a second set of first and second bias voltages, respectively, to cause PA 220 to be grounded through ground connection 234, e.g., when incoming signal 260 is received. The first and second bias voltages of the first set may be, for example, lesser than the first and second bias voltages of the second set, respectively. For example, controller 224 may provide the first transistor with a bias voltage of 0.7V and the second transistor with a bias voltage of 2V, to cause PA 220 to be activated, and/or controller 224 may provide the first transistor with a bias voltage greater than 0.7V, e.g., 1.3V, and the second transistor with a bias voltage greater than 2V, e.g., 3V, to cause PA 220 to be grounded. In some demonstrative embodiments, PA 220 may be connected to a supply voltage 216, when PA 220 is active; and/or PA 220 may be disconnected from supply voltage 216, when PA 220 is grounded, for example, in order to avoid and/or decrease a power loss and/or drainage of power supply 216 via PA 220. Supply voltage 216 may include, for example, a positive operating voltage of wireless communication unit 216, e.g., a Vdd power supply and/or any other suitable supply voltage.

In some demonstrative embodiments, wireless communication unit 200 may include a switchable connector 218 to selectively connect between PA 220 and supply voltage 216. For example, controller 224 may cause switchable connector 218 to switch between a first mode at which PA 220 is connected to supply voltage 216, and a second mode at which PA 220 is disconnected from supply voltage 216. For example, controller 224 may switch connector 218 to connect PA 220 to supply voltage 216, for example, when PA 220 is activated, e.g., when outgoing signal 240 is transmitted via antenna 250. Controller 224 may switch connector 218 to disconnect PA 220 from supply voltage 216, for example, when PA 220 is grounded, e.g., when incoming signal 260 is received via antenna 250. Switchable connector 218 may include any suitable connector, e.g., a physical component, capable of connecting or disconnecting PA 220 to supply voltage 216. For example, switchable connector 218 may include any suitable voltage supply regulator, e.g., a LDO regulator or a DC/DC regulator capable of regulating, monitoring and/or controlling DC current supplied to PA 220. Switchable connector 218 may have, for example, a very small and/or negligible size, e.g., in comparison to the size of PA 220.

In some demonstrative embodiments, wireless communication unit 200 may include a non-active connector module 214 configured to electrically connect Tx chain 210 to antenna 250, e.g., when Tx chain 210 generates wireless communication signal 240; and/or to electrically disconnect antenna 250 from Tx chain 210, e.g., when incoming signal 260 is received via antenna 250.

In some demonstrative embodiments, non-active connector module 214 may include a suitable impedance matching network configured to match between an impedance of Tx chain 210 and an impedance of antenna 250, e.g., when signal 240 is transmitted and/or to reflect an elevated impedance of Tx chain 210, e.g., in comparison to the impedance of Rx chain 212, when incoming signal 260 is received. For example, in order to transmit outgoing signal 240, PA 220 may be activated and non-active connector module 214 may match the impedance of Tx chain 210 and antenna 250, to enable Tx chain 210 to transmit outgoing signal 240. In order to receive incoming signal 260, PA 220 may be grounded and, accordingly, non-active connector module 214 may reflect an elevated impedance of Tx chain 210, to enable Rx chain 212 to receive incoming signal 260.

In some demonstrative embodiments, non-active connector module 214 may include any suitable matching network configuration. For example, non-active connector module 214 may include an inductor 238 connected in series with a capacitor 236, and a capacitor 241 having a first side connected between capacitor 236 and inductor 238 and a second side connected to the ground through a ground connection 242.

In some demonstrative embodiments, when PA 220 is grounded, e.g., when controller 224 grounds PA 220 as described above, non-active connector module 214 may electrically disconnect antenna 250 from Tx chain 210. For example, when incoming signal 260 is received by wireless communication unit 200, controller 224 may ground PA 220 by providing the second bias voltage to transistor 232. Accordingly, non-active connector module 214 may reflect an elevated impedance of Tx chain 210 to electrically disconnect Tx chain 210 from antenna 250. As a result, incoming signal 260 may be provided to Rx chain 212 when received via antenna 250.

Figure 3:
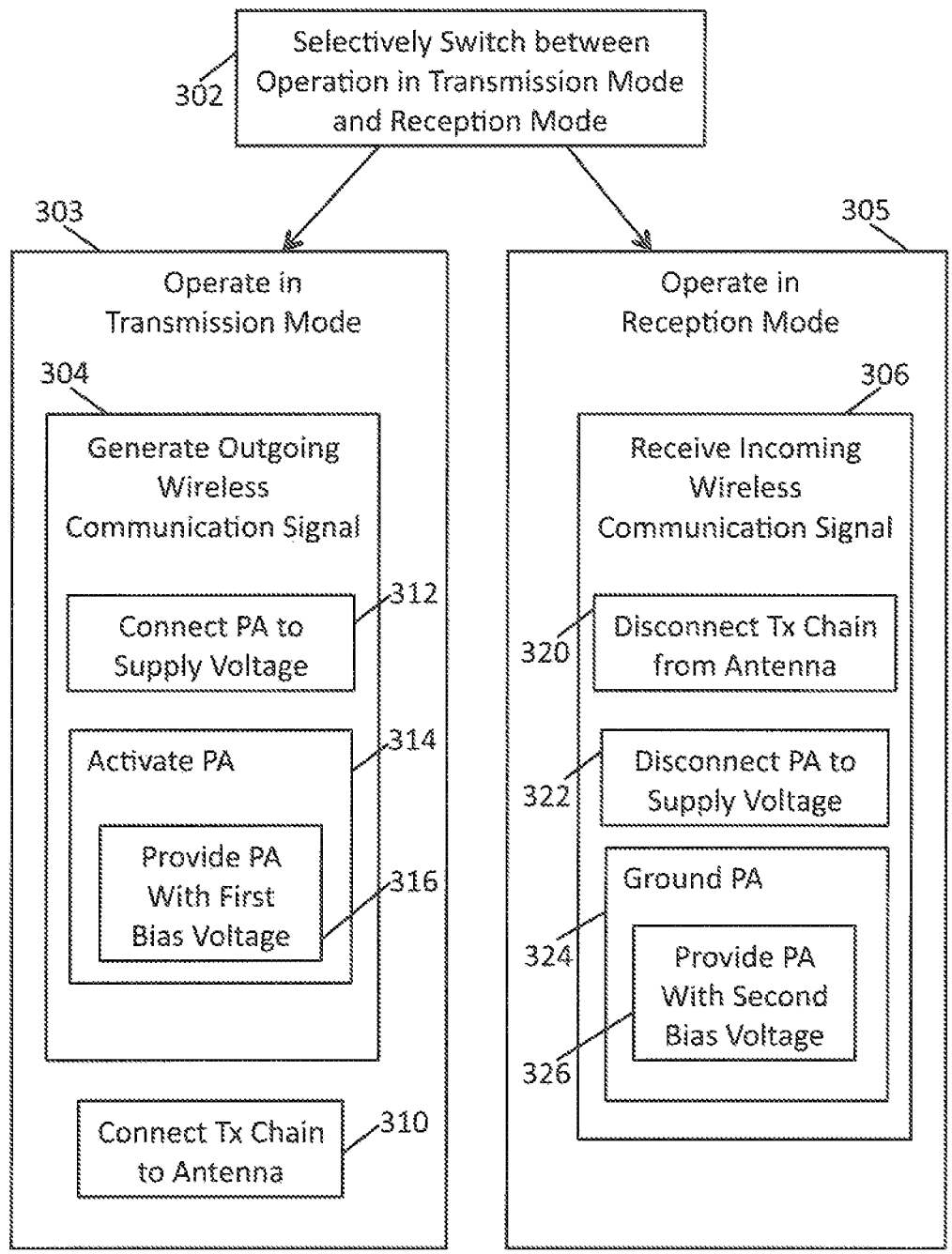
FIG. 3 is a schematic flow-chart illustration of a method of selectively connecting a transmit (Tx) chain to an antenna, in accordance with some demonstrative embodiments.

Reference is now made to FIG. 3, which schematically illustrates a method of selectively connecting a Transmit (Tx) chain to an antenna, in accordance with some demonstrative embodiments.

In some demonstrative embodiments, one or more of the operations of the method of FIG. 3 may be performed by one or more elements of a wireless communication system, e.g., system 100 (FIG. 1), for example, a wireless communication device, e.g., wireless communication device 102 (FIG. 1), a wireless communication unit, e.g., wireless communication unit 108 (FIG. 1), and/or any other wireless communication device capable of receiving and/or transmitting wireless communication signals.

As indicated in block 302, the method may include selectively switching between operation in a transmission mode and a reception mode. For example, wireless communication unit 108 (FIG. 1) may switch between the transmission mode to generate outgoing signal 140 (FIG. 1), and the reception mode to receive incoming signal 150 (FIG. 1).

As indicated in block 303, the method may include operating in the transmission mode, e.g., to transmit a wireless communication signal via an antenna, as described above.

As indicated at block 304, the method may include generating an outgoing wireless communication signal. For example, Tx chain 104 (FIG. 1) may generate outgoing signal 140 (FIG. 1), as described above.

As indicated in block 312, the method may include connecting a PA to a supply voltage. For example, switchable connector 124 (FIG. 1) may electrically connect PA 128 (FIG. 1) to supply voltage 126 (FIG. 1), as described above.

As indicated in block 314, the method may include activating the PA, e.g., to amplify the outgoing signal. For example, controller 224 (FIG. 2) may activate PA 220 (FIG. 2), as described above.

As indicated in block 316, activating the PA may include providing the PA with a first bias voltage. For example, controller 224 (FIG. 2) may activate PA 220 (FIG. 2) by providing transistor 232 (FIG. 2) of PA 220 (FIG. 2) with a first bias voltage.

As indicated in block 310, the method may include electrically connecting the Tx chain to the antenna, e.g., to enable the transmission of the outgoing signal. For example, non-active connector module 122 (FIG. 1) may electrically connect Tx chain 104 to antenna 110, e.g., by matching between an impedance of Tx chain 104 (FIG. 1) and the impedance of antenna 110 (FIG. 1), as described above.

As indicated in block 305, the method may include operating in reception mode, e.g., to receive a wireless communication signal via the antenna, as described above.

As indicated at block 306, the method may include receiving an incoming wireless communication signal. For example, Rx chain 106 (FIG. 1) may receive and/or process incoming signal 150 (FIG. 1), as described above.

As indicated in block 320, the method may include disconnecting the Tx chain from the antenna, e.g., to enable the reception of the incoming signal by the Rx chain. For example, non-active connector module 122 (FIG. 1) may disconnect Tx chain 104 (FIG. 1) from antenna 110 (FIG. 1) to enable the reception of incoming signal 150 (FIG. 1) by Rx chain 106 (FIG. 1).

As indicated in block 322, the method may include disconnecting the PA from the supply voltage, e.g., to avoid power loss when the Tx chain is disconnected from the antenna. For example, controller 224 (FIG. 2) may cause switchable connector 218 (FIG. 2) to electrically disconnect PA 220 (FIG. 2) from supply voltage 216 (FIG. 2), as described above.

As indicated in block 324, the method may include grounding the PA. For example, controller 224 (FIG. 2) may ground PA 220 (FIG. 2), as described above.

As indicated in block 326, grounding the PA may include providing the PA with a second bias voltage. For example, controller 224 (FIG. 2) may ground PA 220 (FIG. 2) by providing transistor 232 (FIG. 2) of PA 220 (FIG. 2) with a second bias voltage.

Current and/or best current switching designs, e.g., as are known in the art, may include an active switch implemented as part of a floating bulk topology, in which the active switch is associated with one or more bulks (also known as "floating bulks"). The elements of a floating bulk topology are not connected directly to a ground but use one or more high resistivity elements. Accordingly, the floating bulk topology may increase some risks of latch-up and/or failure due to handling. A "less floating" topology may include a reduced number of floating bulks. Accordingly, the active switch may be more "protected" from failure. However, the "less floating" topology may have reduced performance. In addition, the active switch may interact with the output signal at high output powers and limit the power amplifier's performance.

In some demonstrative embodiments, a wireless communication unit, which does not include an active switch, e.g., wireless communication unit 108 (FIG. 1), may not require any floating bulk topology. As a result, the wireless communication unit according to some demonstrative embodiments may have increased performance.

Figure 4:
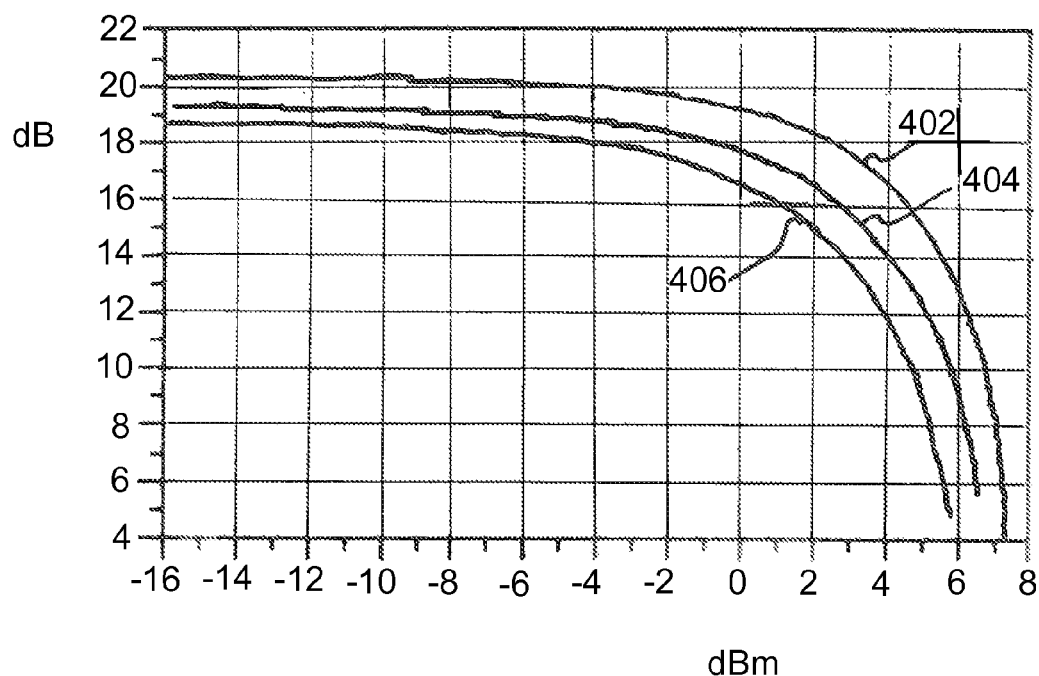
FIG. 4 is a schematic illustration of a graph depicting three curves representing gains of a wireless communication unit versus output power (Pout) values of the wireless communication unit corresponding to three respective switching topologies, in accordance with some demonstrative embodiments.

Reference is now made to FIG. 4, which illustrates a graph depicting three curves 402, 404 and 406, representing gains of a wireless communication unit versus output power (Pout) values of the wireless communication unit corresponding to three respective switching topologies, in accordance with some demonstrative embodiments.

Curve 402 represents the gain versus Pout values of a wireless communication unit, e.g., wireless communication unit 108 (FIG. 1) operating in a frequency band of 60 Gigahertz (Ghz). Curve 404 represents the gain versus Pout values a conventional wireless communication unit including an active switch according to a floating bulk topology, in the frequency band of 60 Ghz. Curve 406 represents the gain versus Pout values of a conventional wireless communication unit including an active switch according to a "less floating" bulk topology the a conservative current design, in the frequency band of 60 Ghz.

As shown in FIG. 4, in some demonstrative embodiments, on the 60 Ghz frequency band, wireless communication unit 108 (FIG. 1) may have an improved gain, e.g., up to 2 decibels (dB), and/or an improved power consumption, e.g., up to 26% efficiency improvement, in comparison to the conventional wireless communication units.

Figure 5:
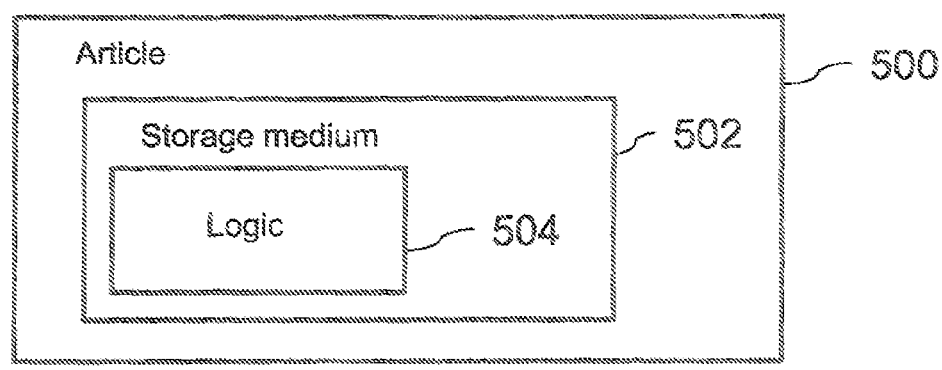
FIG. 5 is a schematic illustration of an article of manufacture, in accordance with some demonstrative embodiments.

Reference is made to FIG. 5, which schematically illustrates an article of manufacture 500, in accordance with some demonstrative embodiments. Article 500 may include a machine-readable storage medium 502 to store logic 504, which may be used, for example, to perform at least part of the functionality of unit 108 (FIG. 1) and/or wireless communication device 102 (FIG. 1); and/or to perform one or more operations of the method of FIG. 3.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device comprising:
   a transmit chain including a power amplifier;
   a non-active connector module configured to electrically connect the transmit chain to at least one antenna when the transmit chain generates an outgoing wireless communication signal, and to electrically disconnect the antenna from the transmit chain when an incoming wireless communication signal is received via the antenna, said antenna is directly connected to a receive chain; and
   a switchable connector to electrically connect the power amplifier to a supply voltage when the outgoing wireless communication signal is transmitted by the transmit chain, and to electrically disconnect the power amplifier from the supply voltage when the incoming wireless communication signal is received via the antenna.

2. The device of claim 1, wherein the non-active connector includes an impedance matching network connected between the transmit chain and the antenna.

3. The device of claim 2, wherein the impedance matching network includes:
   an inductor and a first capacitor connected in series; and
   a second capacitor having a first side connected between the first capacitor and inductor and a second side connected to ground.

4. The device of claim 1, wherein the power amplifier is to be activated to amplify the outgoing wireless communication signal generated by the transmit chain, and wherein the power amplifier is to be grounded when the incoming wireless communication signal is received via the antenna.

5. The device of claim 4 including a controller to activate the power amplifier by providing a first bias voltage to the power amplifier and to ground the power amplifier by providing a second bias voltage to the power amplifier.

6. The device of claim 1, wherein the receive chain is to process the incoming wireless communication signal received via the antenna.

7. The device of claim 1, wherein the outgoing wireless communication signal generated by the transmit chain includes a wireless communication signal over a frequency band of at least 60 gigahertz.

8. A wireless communication system comprising:
   a wireless communication device including:
      at least one antenna directly connected to a receive chain;
      at least one transmit chain including at least one power amplifier; and
      a switchable connector to electrically connect the power amplifier to a supply voltage when the transmit chain is to transmit an outgoing wireless communication signal via the antenna, and to electrically disconnect the power amplifier from the supply voltage when an incoming wireless communication signal is received via the antenna.

9. The system of claim 8, wherein the wireless communication device includes at least one controller to activate the power amplifier to amplify the outgoing wireless communication signal transmitted via the antenna, and to ground the power amplifier when the incoming wireless communication signal is received via the antenna.

10. The system of claim 9, wherein the controller is to activate the power amplifier by providing a first bias voltage to the power amplifier, and to ground the power amplifier by providing a second bias voltage to the power amplifier.

11. The system of claim 8, wherein the wireless communication device includes at least one non-active connector to electrically connect the transmit chain to the antenna when the transmit chain generates the outgoing wireless communication signal, and to electrically disconnect the antenna from the transmit chain when the incoming wireless communication signal is received via the antenna.

12. The system of claim 8, wherein the receive chain is to process the incoming wireless communication signal received via the antenna.

13. The system of claim 8, wherein the outgoing wireless communication signal transmitted via the antenna includes a wireless communication signal over a frequency band of at least 60 gigahertz.

14. A method comprising:
   activating a power amplifier of a transmit chain to amplify an outgoing wireless communication signal to be transmitted via at least one antenna, which is connected to the transmit chain, said antenna is directly connected to a receive chain;
   electrically connecting the power amplifier to a supply voltage when the outgoing wireless communication signal is transmitted via the antenna; and
   when an incoming wireless communication signal is received via the antenna, grounding the power amplifier and disconnecting the power amplifier from the supply voltage.

15. The method of claim 14, wherein activating the power amplifier includes providing a first bias voltage to the power amplifier, and wherein grounding the power amplifier includes providing a second bias voltage to the power amplifier.

16. The method of claim 14 including:
   electrically connecting the transmit chain to the antenna when the transmit chain generates the outgoing wireless communication signal; and
   electrically disconnecting the antenna from the transmit chain when the incoming wireless communication signal is received via the antenna.

17. The method of claim 14 including processing the incoming wireless communication signal received via the antenna.

18. The method of claim 14, wherein the outgoing wireless communication signal transmitted via the antenna includes a wireless communication signal over a frequency band of at least 60 gigahertz.

* * * * *